No. 763,052.  
PATENTED JUNE 21, 1904.

J. F. ETCHISON.  
COLT OR CALF WEANER.  
APPLICATION FILED OCT. 20, 1903.

NO MODEL.

Witnesses:  
J. A. Williams  
W. B. Jarrell

Inventor:  
J. F. Etchison

No. 763,052.

Patented June 21, 1904.

UNITED STATES PATENT OFFICE.

JOHN F. ETCHISON, OF GALLEGOS, TERRITORY OF NEW MEXICO.

COLT OR CALF WEANER.

SPECIFICATION forming part of Letters Patent No. 763,052, dated June 21, 1904.

Application filed October 20, 1903. Serial No. 177,826. (No model.)

*To all whom it may concern:*

Be it known that I, JOHN FRANKLIN ETCHISON, of Gallegos, in the county of Union, in the Territory of New Mexico, have invented a certain new and useful Improvement in Colt or Calf Weaners, of which the following is a full, clear, and exact description.

The invention comprises a block of material, preferably rubber, constructed to be fitted into and suspended from the animal's nostrils so as to cover its mouth, hollowed out so as to prevent the animal from passing its tongue in front of it, and provided with a rigid sustaining device to keep the weaner in place and also prevent the animal wearing it from throwing it upward and backward, all as I will proceed now more particularly to set forth and finally claim.

Figure 1:
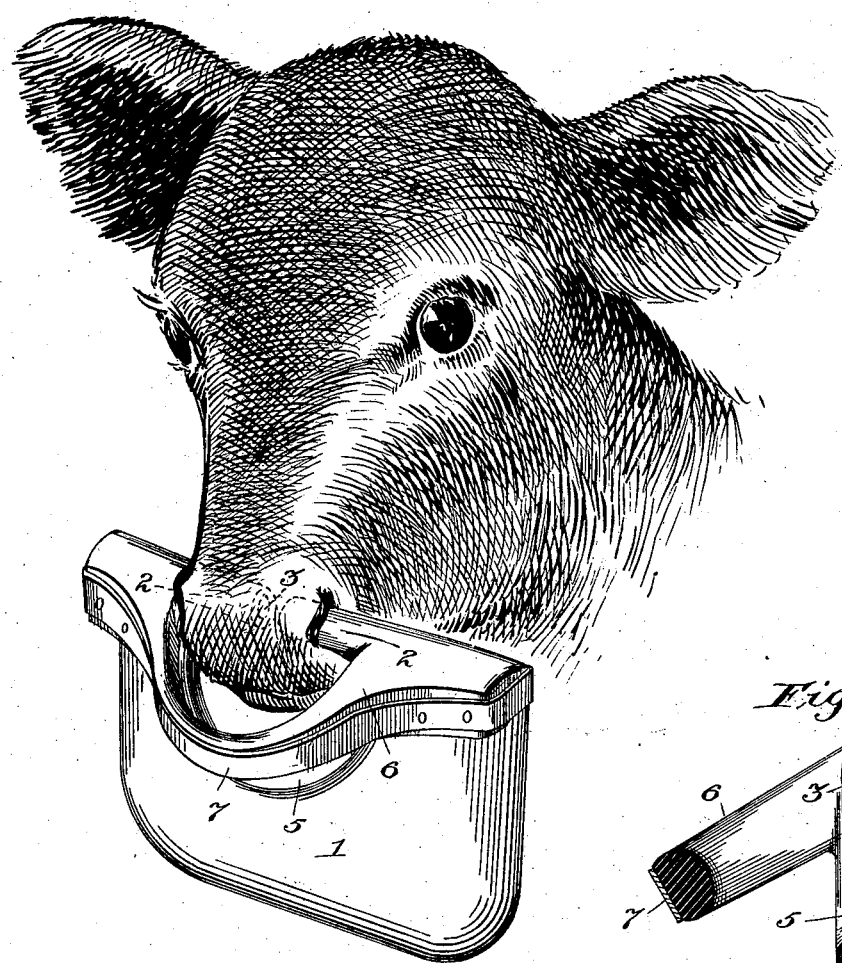
Figure 2:
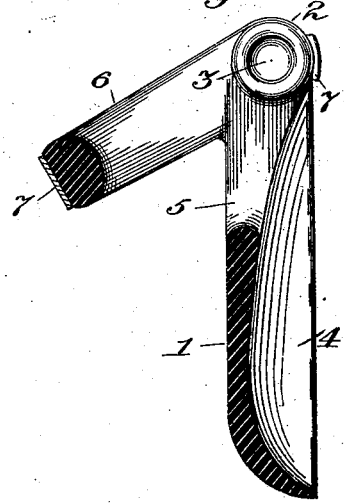

In the accompanying drawings, illustrating the invention, in the two figures of which like parts are similarly designated, Figure 1 is a perspective view. Fig. 2 is a longitudinal section.

The body 1 in general is of rectangular outline, and its upper edge is provided with opposite inwardly-extending integral and fixed projections 2, made hollow, as at 3, and adapted to fit in the nostrils and come into contact with the septum or dividing-gristle of the nose, the tubular character of these projections serving to minimize the danger of irritation. The under part of this body is hollowed out, as at 4, so as to turn back the tip of the tongue of the animal wearing it, and thus prevent the passing of the tongue in front of the device.

The upper portion of the body is cut away, as at 5, and spanning this portion is a bow 6, which is reinforced by a band 7.

The body 1, projections 2, and bow 6 are preferably made of rubber because of its durability and elasticity and so that the animal may wear it without irritation of the portions of the nose with which it comes in contact.

The band 7 is preferably of spring-steel and serves to reinforce the bow and keep the weaner in place. The reinforced bow prevents the animal from throwing the weaner upward and backward, the same projecting sufficiently forward for this purpose.

While the form and arrangement shown are preferred, the invention is not limited to these details, and modifications thereof are permissible within the scope of the invention.

What I claim is—

1. A colt and calf weaner, comprising a solid body portion having integral and fixed projections by which it may be fitted to the animal's nostrils, and composed of rubber.

2. A colt and calf weaner, composed of a body portion having fixed, integral, hollow projections by which it may be fitted to the animal's nostrils, and an outwardly-projecting bow, all constructed of rubber.

3. A colt and calf weaner, composed of a body portion having projections by which it may be fitted to the animal's nostrils, and an outwardly-projecting bow, all constructed of rubber, and a spring-reinforce applied to said bow.

4. A colt and calf weaner, adapted to be suspended from the animal's nose and having a hollowed-out portion next the animal's mouth to prevent the animal from passing its tongue in front of the device.

5. A colt and calf weaner, comprising a body portion, and projections thereon whereby it may be suspended from the animal's nose, and an outwardly-projecting reinforced bow serving to prevent the animal from throwing the weaner upward and backward.

In testimony whereof I have signed my name to this specification in the presence of two subscribing witnesses.

J. F. ETCHISON.

Witnesses:
 THEO. W. HEMAN,
 G. H. WINN.